UNITED STATES PATENT OFFICE.

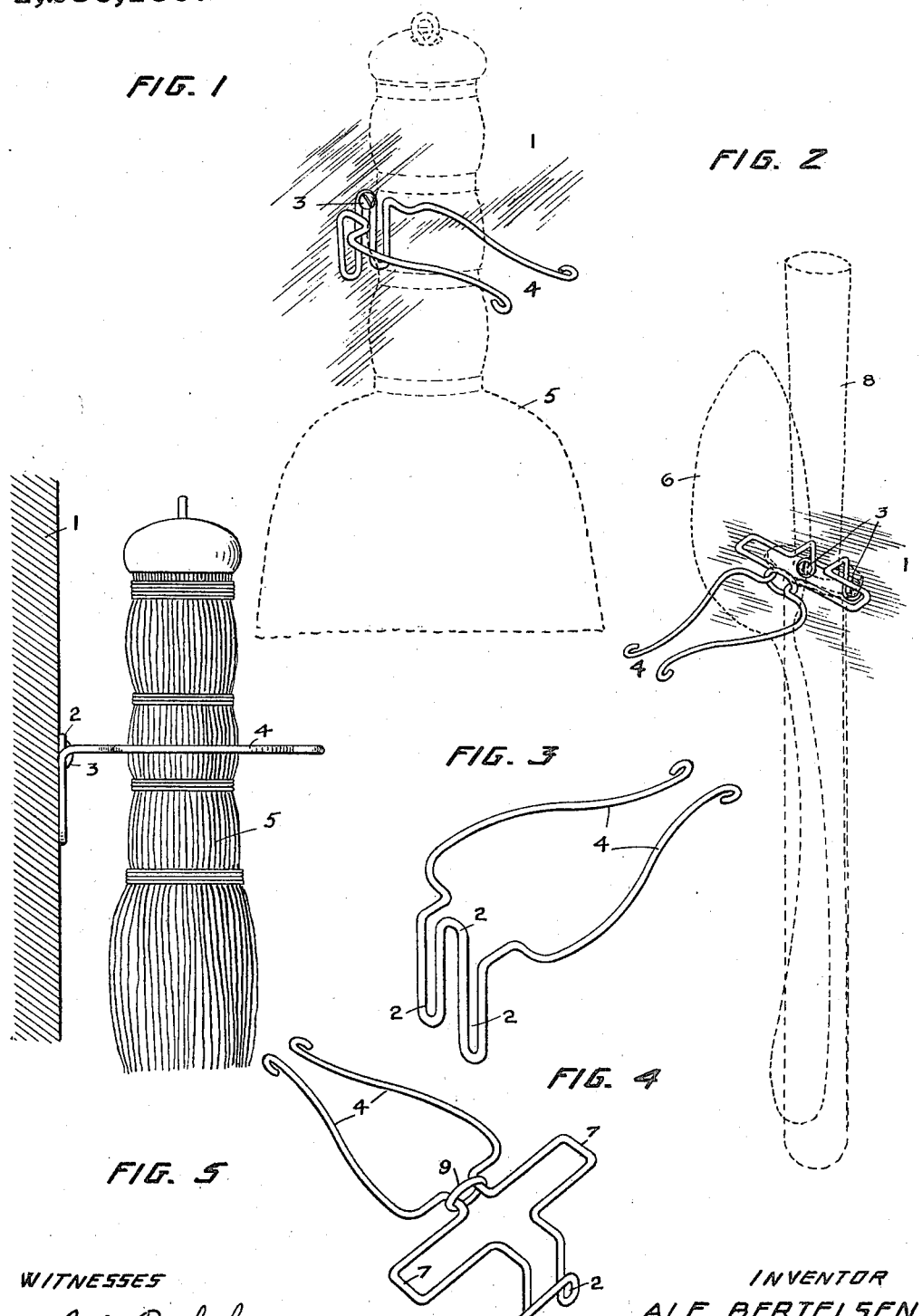

ALF BERTELSEN, OF SAN FRANCISCO, CALIFORNIA.

UTENSIL-HOLDER.

1,236,139.  Specification of Letters Patent.  Patented Aug. 7, 1917.

Application filed October 3, 1913. Serial No. 793,155.

*To all whom it may concern:*

Be it known that I, ALF BERTELSEN, a subject of the King of Norway, residing in the city and county of San Francisco, State of California, have invented certain new and useful Improvements in Utensil-Holders, whereof the following is a specification.

This invention relates to devices for holding brushes, spoons, knives, forks and other utensils, the object being to produce a holder which can be readily attached to a wall, for example, at any convenient place, by simply inserting a nail or screw, or a couple of them.

To this end the invention comprises a wire bent into one or more loops adapted to engage one or more nails or screws and to rest against the wall, and projecting therefrom, engaging or holding members adapted to receive and engage the article to be held.

The details of the invention may be best understood from the subjoined description, and the accompanying one sheet of drawings, of a specific embodiment of it.

In the drawing:

Figure 1 is a perspective view showing the device attached to a wall and holding a wisp broom, the latter being shown in dotted lines.

Fig. 2 is a similar view of the device as adapted to holding a knife and a spoon which are shown in dotted lines, the form of the device being modified from that shown in Fig. 1 to adapt it for the various uses.

Fig. 3 is an enlarged perspective view of the device of Fig. 1.

Fig. 4 is an enlarged perspective view of the device of Fig. 2.

Fig. 5 is a side elevation of the device of Fig. 1 with the wisp broom.

In these figures:

1 represents a wall or the wainscoting about a kitchen sink or a bath tub, to which my device is attached. Inasmuch as the invention is of peculiar utility in a kitchen for holding various utensils, I have shown it more particularly in connection with such use.

The device itself is composed of the loop member provided with the loops 2 which are adapted to bear against the wall 1 and to engage one or more screws 3 which retain it in position.

Projecting from the loop member are the prongs 4 which may receive and hold the handle of a wisp broom 5, as shown in dotted lines in Fig. 1 and full lines Fig. 5 or of other articles, as a spoon, 6, as shown in dotted lines in Fig. 2.

When desired the wire may be bent into the form of one or more loops, as 7 between the loop member and the prong member said loops being adapted to receive a knife 8 as shown in dotted lines in Fig. 2, or other article.

A ring 9 may be applied to that position between the loops and prongs which forms a neck as seen in Figs. 2 and 4 to prevent spreading of the wires and give greater elasticity than would be the case if the wires were engaged at those points by a twist.

Having thus described my invention and believing I have produced useful and novel improvements in the art to which it appertains let it be understood that I do not wish to be limited to the exact construction and arrangement of the several parts composing the same, as many changes can be made without departing from the spirit thereof, but what I claim and desire to secure by United States Letters-Patent is.

In a utensil holder formed of a single piece of spring wire bent vertically to form a depending portion adapted to bear against a wall and engaging means to retain the device in position; thence bent at right angles from said depending portion and projecting outwardly at right angles in opposite directions and therefrom outwardly at right angles, then inwardly at right angles toward each other to form back rigid holding means, then bent outwardly at right angles from said holding means and rebent outwardly therefrom to form a narrow neck and projecting prongs provided with outwardly curved shanks adapted to form front holding means.

In testimony, that I claim the foregoing I have hereto set my hand in the presence of witnesses, this twenty seventh day of September, 1913.

ALF BERTELSEN.

Witnesses:
 F. J. DAVIDSON,
 S. BOWMAN.

Copies of this patent may be obtained for five cents each, by addressing the "Commissioner of Patents, Washington, D. C."